United States Patent
Morris

(10) Patent No.: US 8,028,427 B2
(45) Date of Patent: Oct. 4, 2011

(54) APPARATUS AND METHOD FOR POSITIONING A WORKPIECE

(75) Inventor: Stephen J. Morris, Shrewsbury (GB)

(73) Assignee: Nightingale-EOD Ltd., Wrexham, Clwyd (GB)

(*) Notice: Subject to any disclaimer, the term of this patent is extended or adjusted under 35 U.S.C. 154(b) by 0 days.

(21) Appl. No.: 12/594,106

(22) PCT Filed: Mar. 28, 2008

(86) PCT No.: PCT/GB2008/001134
§ 371 (c)(1), (2), (4) Date: Dec. 8, 2009

(87) PCT Pub. No.: WO2008/119982
PCT Pub. Date: Oct. 9, 2008

(65) Prior Publication Data
US 2010/0107431 A1    May 6, 2010

(30) Foreign Application Priority Data

Mar. 30, 2007 (GB) .................................. 0706314.2

(51) Int. Cl.
*G01B 11/27* (2006.01)
(52) U.S. Cl. .................. 33/286; 250/559.3; 356/141.3; 356/139.03
(58) Field of Classification Search .................. 33/286; 250/559.3; 356/141.3, 139.03
See application file for complete search history.

(56) References Cited

U.S. PATENT DOCUMENTS

| | | | | |
|---|---|---|---|---|
| 2,546,524 | A | * | 3/1951 | Schipplock .................... 356/154 |
| 4,341,472 | A | * | 7/1982 | Gorog et al. ................... 356/399 |
| 4,918,320 | A | * | 4/1990 | Hamasaki et al. ............. 250/548 |
| 5,546,186 | A | * | 8/1996 | Ohi ................................ 356/458 |
| 5,588,216 | A | * | 12/1996 | Rank et al. ...................... 33/286 |
| 5,798,828 | A | * | 8/1998 | Thomas et al. ............. 356/141.3 |
| 6,810,595 | B2 | * | 11/2004 | Chan ............................... 33/286 |
| 6,975,399 | B2 | * | 12/2005 | Fukui ............................. 356/401 |
| 7,165,332 | B2 | * | 1/2007 | McGrail et al. ................. 33/286 |
| 7,480,050 | B2 | * | 1/2009 | Den Boef et al. ............. 356/364 |

FOREIGN PATENT DOCUMENTS

| | | |
|---|---|---|
| JP | 2001021505 A | 1/2001 |
| JP | 2006226900 A | 8/2006 |
| WO | WO-0228309 | 4/2002 |

OTHER PUBLICATIONS

International Search Report for PCT/GB2008/001134 dated Jun. 23, 2008.
Written Opinion for PCT/GB2008/001134.
Cox, I.J., et al., "Digital Image Processing of Confocal Images," Image and Vision Computing, vol. 1, No. 1, Feb. 1983.

* cited by examiner

*Primary Examiner* — Christopher Fulton
(74) *Attorney, Agent, or Firm* — Bingham McCutchen LLP

(57) ABSTRACT

A stage for aligning a workpiece relative to analyzing apparatus. The stage has a platform and means for maintaining a workpiece on the platform. The platform is operable to tilt relative to the analyzing apparatus and thereby rotate the workpiece relative to the analyzing apparatus.

7 Claims, 3 Drawing Sheets

# APPARATUS AND METHOD FOR POSITIONING A WORKPIECE

CROSS-REFERENCE TO RELATED APPLICATIONS

This application is the national phase of International (PCT) Patent Application Serial No. PCT/GB2008/001134, filed on Mar. 28, 2008, published under PCT Article 21(2) in English, which claims priority to and the benefit of British Patent Application No. 0706314.2, filed on Mar. 30, 2007, the disclosure of each of which is incorporated herein by reference.

The present invention relates to apparatus and a method for positioning a workpiece and particularly for positioning a workpiece having a curved surface.

For the benefit of clarity the present invention is described with reference to a workpiece. However, it will be appreciated that the invention is equally applicable to any other objects, such as, for example, samples, devices or the like, having a curved surface.

In order to examine or analyse a workpiece in greater detail it is common practice to mount the workpiece on a stage. Examination, or analysis, of a workpiece may for example involve reflecting radiation, such as light, off the workpiece and analysing the reflected radiation to characterise the properties of the workpiece. In such an example, it is important to be able to align the workpiece with the analysing apparatus sufficiently accurately, such that the reflected radiation is captured. This entails the determination not only of the location of the workpiece but also its orientation.

It is often a further requirement that a particular feature on a surface, for example a fiducial or a selected analysis point, be retained at a particular location in space whilst the orientation of the workpiece is manipulated in order to comply with some criterion for overall alignment. For example, when performing Beam Profile Reflectometry on a curved sample the sample orientation should preferably be adjusted such that the tangent plane to the surface at the location where a focused laser beam impinges upon the surface be perpendicular to the axis of the laser beam. This adjustment must be accomplished in such a way that the laser remains focused on the same feature throughout.

According to a first aspect of the present invention there is provided a stage for aligning a workpiece relative to an analysing apparatus, comprising a platform and means for mounting a said workpiece on the platform, wherein the platform is operable to tilt relative to the analysing apparatus and thereby rotate the workpiece relative to the analysing apparatus.

In cases where the workpiece must be rotated about a horizontal axis in order to facilitate the necessary analysis, the means for mounting the workpiece may further comprise at least one roller operable selectively to rotate the workpiece. The means for mounting the workpiece preferably comprises two rollers.

In addition to being tiltable the platform may also be tippable. Additionally, the platform is advantageously operable to provide linear motion in x, y and z directions.

The combination of elements making up the stage constitutes a robotic system whereby the workpiece may be driven to any combination of location and orientation permitted by the hardware, that combination of location and orientation being specified by a set of co-ordinates which may be defined relative to the outside world ('world co-ordinates'), to the various moving elements (or joints) of the stage itself ('joint co-ordinates') or to the workpiece itself or a particular location thereupon ('tool co-ordinates'). Transformations between the appropriate co-ordinate systems can be derived for any given stage design.

According to a second aspect of the present invention there is provided an analysing apparatus comprising means for detecting radiation reflected off a surface of a workpiece from a focused beam of radiation incident thereon and analysing means sensitive to the intensity and symmetry of the reflected radiation.

Such an analysing apparatus may be, for example, a measurement system which enables radiation to be focused upon the surface of the workpiece and the characteristics of the reflected radiation to be analyzed. Optionally the measurement system may be combined with a vision system enabling the position of the radiation focus relative to some other feature within the vision system's field of view to be determined, either by a human observer or by an appropriate machine vision application.

According to a third aspect of the present invention there is provided a method of locating an analyzing beam of radiation upon the workpiece,
    placing the workpiece at the focus of the analyzing beam,
    examining the symmetry of the reflected radiation,
    manipulating the workpiece in a manner equivalent to
        making rotations about perpendicular axes through the
        beam focus,
    recognizing that correct alignment has been obtained when
        the reflected radiation beam is symmetrical.

The method involves, for example, locating the origin of the tool co-ordinate system to facilitate alignment of the workpiece relative to this point in space, and then to manipulate the stage system in such a way as to ensure that the tangent plane to the surface at the location where the beam impinges upon the surface is perpendicular to the axis of the laser beam.

The present invention will now be described in more detail with reference to the accompanying drawings, in which.

Figure 4:
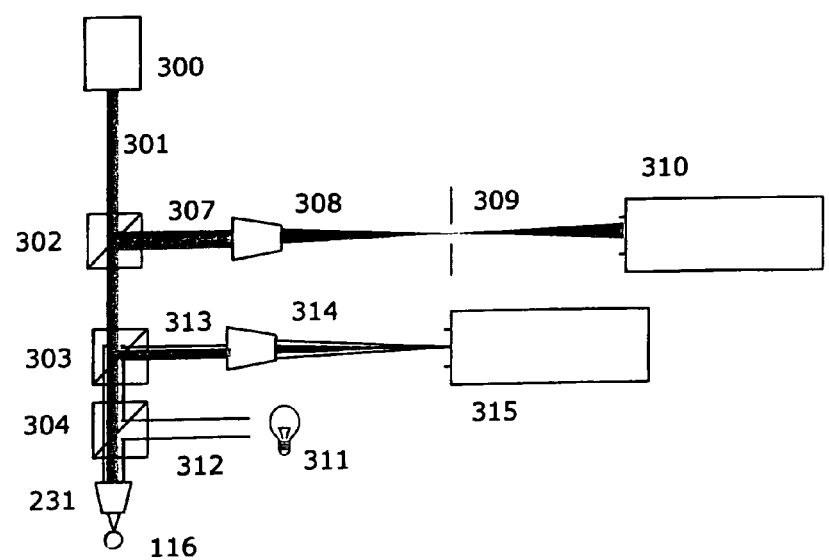

FIG. 4 is a drawing showing the preferred arrangement of measurement system and vision system based around a focused laser beam. The laser beam detector may be any element capable of detecting both the intensity and symmetry (or, equivalently, the centroid location) of the laser beam: for example, a digital camera, a pair of crossed linear CCD arrays, a quad-cell detector, or a lateral-effect Position Sensitive Detector (PSD).

Figures 5, 5A, 5B, 5C:
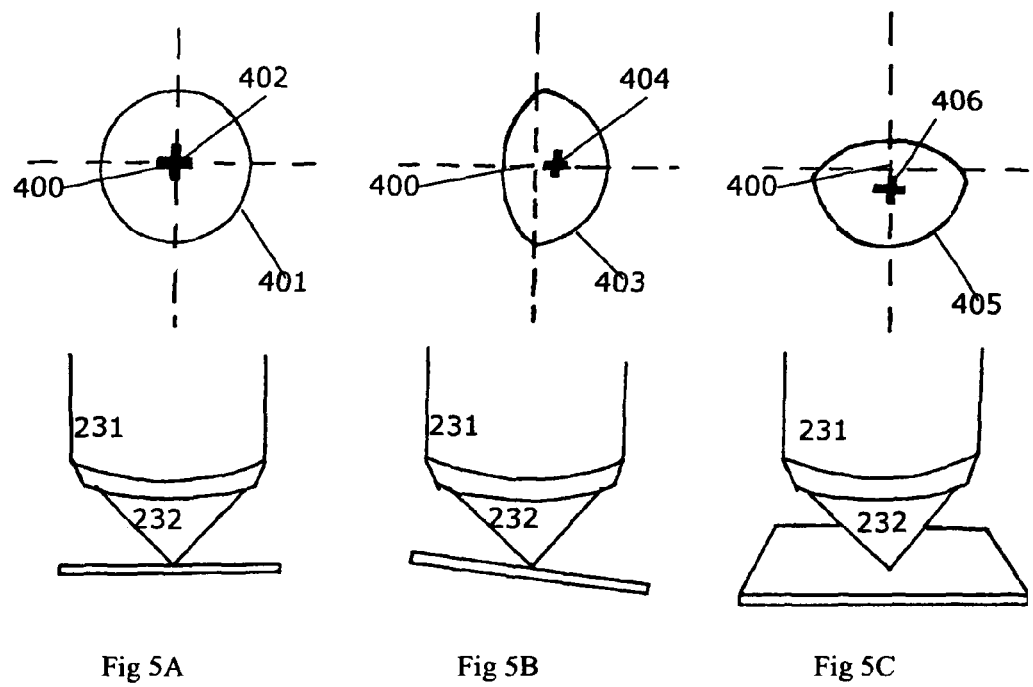

FIGS. 5 (A) through (C) show the laser beam profiles observed at the detector in the case of (A) perfect alignment, (B) tilt misalignment along the 'y' axis, and (C) tip misalignment along the 'x' axis.

Figure 1:
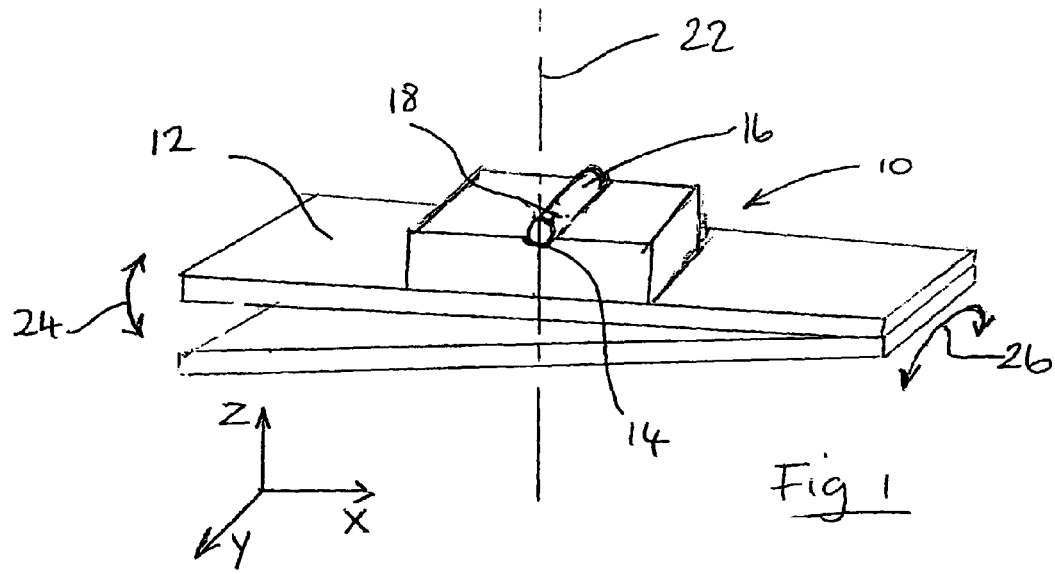
FIG. 1 is a drawing showing a side view of a first embodiment of a stage according to the present invention.

Referring to FIG. 1, a first embodiment of a stage 10, according to the present invention, comprises a platform 12 and means for mounting a workpiece 16 having a curved surface 18. The means for mounting is in the form of a channel or groove 14, suitably sized to receive the workpiece.

A controller controls the movement of the platform 12 to align a predetermined portion of the curved surface 18, of the workpiece 16, with a predetermined alignment axis 22 of an analysing apparatus.

The controller is operable to move the platform 12 linearly along the x, y and z axes and additionally in a pitch (or tilt) motion 24 and yaw (or tip) motion 26. The tilt motion 24 provides limited rotational motion about the y axis and the tip motion 26 provides limited rotational motion about the x axis.

In use, alignment of the predetermined portion of the curved surface 18, of the workpiece under analysis, with the alignment axis 22 is facilitated by actuating the controller to pitch 24 the platform, such that it consequently rotates the workpiece 16 about an axis parallel to the y axis.

Figure 2:
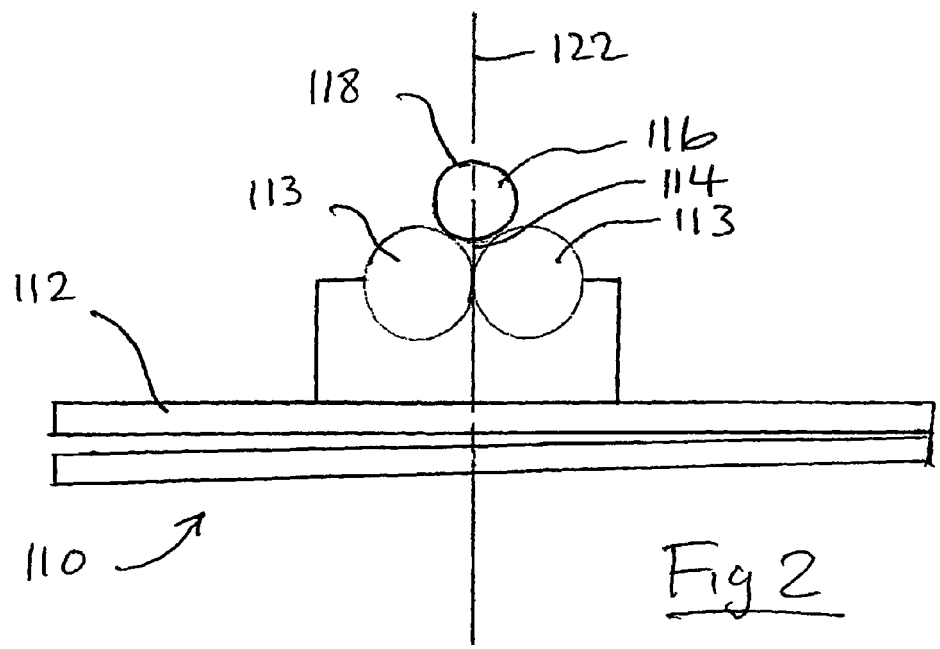
FIG. 2 is a drawing showing a side view of a second embodiment of a stage according to the present invention.

Referring to FIG. 2, a preferred embodiment of a stage 110, according to the present invention, comprises a platform 112 and means for mounting a workpiece 116 having a curved surface 118. The means for mounting is in the form of a pair of rollers 113 which are disposed on the platform 112, parallel to each other, such that they each rotate about an axis parallel to the y-axis. The pair of rollers form a groove 114 therebetween in which, in use, the workpiece 116 is disposed for analysis.

A controller controls the movement of the platform 112 and the pair of rollers 113 to align a predetermined portion of the curved surface 118, of the workpiece 116, with a predetermined alignment axis 122 of an analysing apparatus.

The controller is operable to move the platform 112 linearly along an x, y and z axis and additionally in tilt motion and tip motion, as described in relation to the first embodiment above. Additionally, the controller is operable to rotate the rollers 113.

Having x, y and z linear motion, tilt and tip motion of the platform 112 and rotational motion of the rollers 113, provides for enhanced controllability of alignment of the workpiece, 116, compared to a design supporting only a subset of these motions.

For example, to rotate a 1 mm diameter workpiece 116 through an angle of 1°, so as to bring a predetermined portion of the surface 118 into alignment with the alignment axis 122, a lateral rotation of approximately 0.009 mm (9 µm) is required. This requires a significant degree of precision in controlling the rollers 113 alone. However, if the platform 112 is, for example, 60 mm across, then the same effect can be achieved by pitching one side of the stage up by a distance of 1.05 mm, which requires considerably less control due to the greater radius of curvature in pitching the platform 112 relative to the radius of curvature of the rollers 113. The workpiece 116 would, of course, be raised by approximately 0.53 mm and moved laterally 9 µm (assuming the workpiece was disposed centrally on the platform). However, it will be appreciated that these dimensions are within the resolution of commercially available linear stage systems so this translation may easily be corrected.

The stage 110, according to the present invention, is applicable to analyse many different types of workpiece, and is particularly applicable to analyse medical implants, such as, for example, cardiac stents.

Figure 3:
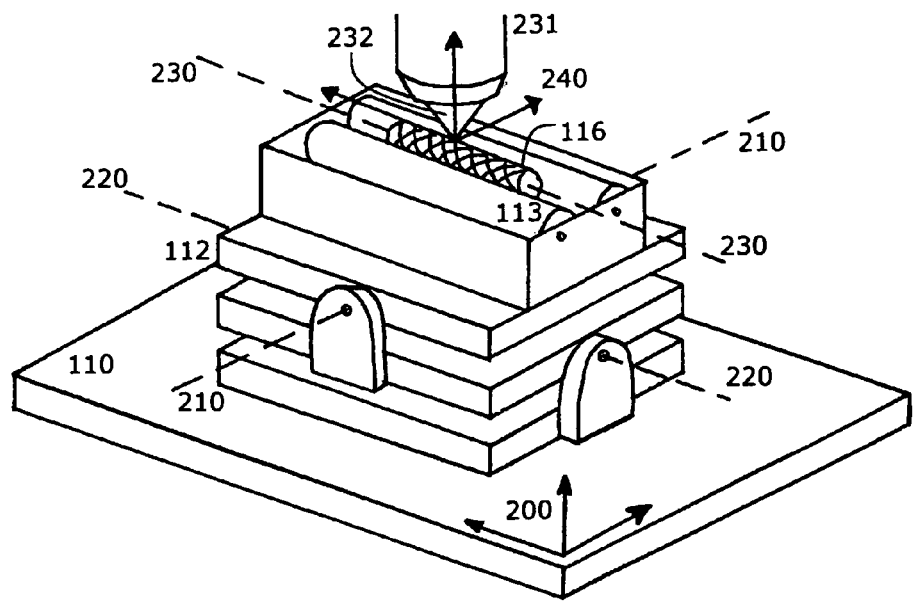
FIG. 3 is a drawing showing an isometric view of the stage shown in FIG. 2.

Referring to FIG. 3, the relationship between 'world co-ordinates', 'joint co-ordinates' and 'tool co-ordinates' may more clearly be seen. The world co-ordinates are represented by a set of conventional Cartesian axes with their origin at an arbitrary point, for example 200. The joint co-ordinates are represented by these Cartesian axes for x, y and z location but with additional parameters to orient the tip axis 210, the tilt axis 220, and the workpiece rotation axis 230. The point where the lens, 231, brings to a focus the radiation beam 232, upon the surface of the workpiece 116, defines the origin of the tool co-ordinates 240, whose axes will ordinarily be parallel with those of the world co-ordinates 200. In particular, the z-axis of the tool co-ordinates is ordinarily the same as the alignment axis 122 of the analysing apparatus as shown in FIG. 2.

Note that FIG. 3 is based on one particular configuration of tip/tilt stage, where the tip axis 210 and tilt axis 220 do not cross and the actual position of tip axis 210 depends at any one time upon the position of the tilt axis 220. Other designs of tip/tilt stage are commercially available wherein the tip axis 210 and tilt axis 220 cross at a point and are not interdependent.

Referring to FIG. 4, the preferred embodiment of a measurement system comprises a laser source 300 which directs a laser beam 301 through a series of beamsplitters 302, 303 and 304 to the lens 231. The light is focused by the lens onto the workpiece 116, from which it is reflected and the reflected laser beam travels back along its incident path through the beamsplitters 304, 303 and 302. A portion 307 of the beam is diverted from beamsplitter 302 towards a relay lens 308, which focuses this portion of the beam onto a pinhole 309 behind which is located a detector 310. The accompanying vision system comprises a source 311 which directs a beam of light 312 (for example, white light) towards beam splitter 304 which reflects the light through lens 231 onto the workpiece 116. The reflected light passes back through the lens 305 and beamsplitter 304, and beamsplitter 303 diverts a portion on the reflected light 313 (which includes some laser light) towards a relay lens 314 which forms an image of the workpiece (together with the laser spot) at camera 315. Optionally, a linepass filter can be placed between beamsplitters 302 and 303 to prevent light from the vision system source 311 from contaminating the reflected laser beam 307, but in practice this has been found not to be necessary if the brightness of the laser beam relative to the vision system source is sufficient.

In use, the alignment of the workpiece proceeds as follows. Firstly, if the user intends to evaluate a particular point upon the surface of the workpiece such as a fiducial or designated measurement point, a coarse rotation of the rollers 113 can be used to rotate the workpiece about its axis 230 and bring the required fiducial or measurement point within the field of view of the vision system. The stage can be moved along its x and y axes until the laser beam is seen to be located at the desired point. This procedure serves to locate the origin of the tool co-ordinate system relative to the world co-ordinate system in x and y. To locate this origin in z, the stage is moved up and down until the intensity of the laser beam at the detector 310 reaches a maximum. This is because when the objective lens 231 focuses light on the surface of the workpiece 116, then the relay lens 308 also focuses an image of the laser spot on the pinhole 309. So long as the pinhole size exceeds that of the spot image, then the whole of the laser light will pass through the pinhole and on to the detector 310. When the objective lens 231 is out of focus, then the image of the laser spot at the pinhole 309 will also be out of focus. As the image will therefore be larger than the pinhole, not all the laser light will pass through and the signal detected by the detector 310 will be attenuated.

Having located the origin of the tool co-ordinate system, the symmetry (or, equivalently, centroid location) of the beam is then evaluated. Referring to FIG. 5, in the case where the surface of the workpiece is level (i.e. the tangent to the surface at the point of focus is perpendicular to the axis of lens 231), then the image at the laser beam detector will be as shown in FIG. 5A. The laser beam profile 401 is round in shape, and its centroid 402 coincides with a notional pair of crosshairs 400 drawn through the centre of the image field in x and y. If the case corresponds to that illustrated in FIG. 5B, with the beam profile 403 having a form similar to an ellipse with its long axis vertical and the centroid 404 displaced to the side, then it can be surmised that the workpiece is misaligned in such a way that a rotation around the 'y' axis is required. If the case corresponds to that illustrated in FIG. 5C, where the beam profile 405 has its long axis horizontal and its centroid 406 displaced vertically, then it can be surmised that the workpiece is misaligned in such a way that a rotation around the 'x' axis is required. Clearly, combinations of these types of misalignment, and misalignments along the same axes but in the opposite senses to those illustrated, may also occur but in all cases it is possible to infer from the properties of the reflected beam which type of stage motion is required in order to improve alignment. Note that if the workpiece has a transparent coating upon it, then there may be fringe patterns superimposed upon the laser beam profiles due to interference effects in the coating, but the overall correlation between profile shape and workpiece orientation will be unchanged.

Viewed from 'world co-ordinates', the alignment of the orientation of the workpiece is attained by an appropriate sequence of rotations around the tip axis 210 and the tilt axis 220, each rotation being accompanied by the appropriate translation of the linear x, y, z stage in order to return the fiducial or measurement point to its original location in space. If the relationship between the different axes of the stage is well calibrated, then these rotations and accompanying translations can of course take place simultaneously such that the measurement point itself never moves. This is equivalent to saying that the measurement point is at the origin of the tool co-ordinates 240, and that the process of aligning the workpiece consists simply of rotations around the tool x and y axes that intersect at this point.

The invention claimed is:

1. A method for aligning a workpiece, comprising the steps of:
    locating an analyzing beam of radiation upon the workpiece,
    placing the workpiece at the focus of the analyzing beam,
    examining the symmetry of the reflected radiation,
    manipulating the workpiece in a manner equivalent to making rotations about perpendicular axes through the beam focus,
    recognizing that correct alignment has been obtained when the reflected radiation beam is symmetrical.

2. A method as claimed in claim 1, further comprising manipulating the workpiece so as to ensure the tangent plane to the surface at the location where the beam impinges upon the surface is perpendicular to the axis of the radiation beam.

3. The method of claim 1, wherein locating the analyzing beam of radiation upon the workpiece comprises moving the workpiece in the x- and y-planes, and focusing the analyzing beam on the workpiece comprises moving the workpiece in the z-plane.

4. A method as claimed in claim 3, further comprising locating the origin of the workpiece co-ordinate system to facilitate alignment of the workpiece relative to this point in space.

5. A method as claimed in claim 4, wherein locating the origin comprises detecting a maximum intensity of the reflected radiation beam.

6. An analyzing apparatus comprising means for detecting radiation reflected off a surface of a workpiece from a focused beam of radiation incident thereon and analyzing means sensitive to the intensity and symmetry of the reflected radiation beam.

7. An analyzing apparatus as claimed in claim 6, further comprising a vision system enabling the beam to be located at a particular point upon the workpiece.

* * * * *